р
3,812,079
STABILIZED LINEAR POLYESTERS

Toshimitsu Okutsu, Nobuo Tsuji, Reiichi Ohi, and Tokiharu Kondo, Kanagawa, Japan, assignors to Fuji Photo Film Co., Ltd., Kanagawa, Japan
No Drawing. Filed Feb. 29, 1972, Ser. No. 230,504
Claims priority, application Japan, Mar. 3, 1971, 46/11,076
Int. Cl. C08g 51/58
U.S. Cl. 260—45.8 A    12 Claims

ABSTRACT OF THE DISCLOSURE

A polyester composition comprising a polyester which is the reaction product of terephthalic acid as the predominant acid component and ethylene glycol as the predominant glycol component and a compound represented by the general formula (I),

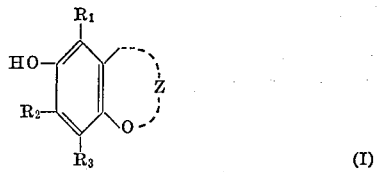

wherein $R_1$, $R_2$ and $R_3$ are the same or different and represent a hydrogen atom, an alkyl radical or a phenyl radical, with the proviso that all of $R_1$, $R_2$ and $R_3$ are not simultaneously hydrogen atoms, and wherein Z represents a methylene chain containing 2 or 3 carbon atoms, said methylene chain being both unsubstituted or substituted is disclosed.

BACKGROUND OF THE INVENTION

Field of the invention

This invention relates to a polyester composition which has excellent stability to heat. More particularly this invention relates to a polyester composition which is excellent in heat resisting properties and which is suitable for use in the preparation of fibers, films and tapes.

Description of the prior art

Polyesters produced by the reaction of polycarboxylic acids, particularly dicarboxylic acids, with polyhydric alcohols, particularly dihydric alcohols, possess various excellent properties and are widely employed in many uses. However, polyesters, as well as other organic polymers, are deteriorated by the action of heat, ultraviolet rays, and the like, thereby the degree of polymerization is lowered, discoloration results, the mechanical strength is lowered and similar disadvantages are caused. Particularly color formation and a lowering of the mechanical strength of fibers, films and tapes caused by deterioration due to heat severely diminish the commercial value.

In order to prevent the deterioration of polyesters, hitherto, many phosphorus compounds, aromatic amino compounds and phenols were proposed. However, although phosphorus compounds are effective for the prevention of color formation caused by the heat decomposition, namely breaking of the polymer chains, these compounds cannot prevent the decomposition itself.

On the other hand, aromatic amino compounds sometimes are decomposed by heat, thereby color formation is caused. Phenols are immiscible with polyesters in many cases and have the disadvantage that they cause a white turbidity.

Therefore, an object of this invention is to provide a stabilizer for polyesters which have improved properties in comparison with the properties of polyesters utilizing known stabilizers. Another object is to provide a polyester composition which is stable to heat. A further object is to provide a process for producing a polyester composition which is excellent in heat stability.

The present inventors have widely investigated methods for improving the stability of polyesters to heat and have newly found that coumaran compounds and chroman compounds are effective for increasing the heat resisting characteristics of polyesters.

SUMMARY OF THE INVENTION

Namely, this invention relates to a polyester composition comprising a polyester composed of terephthalic acid as a main acid component and ethylene glycol as a main glycol component, and a compound represented by the general formula (I)

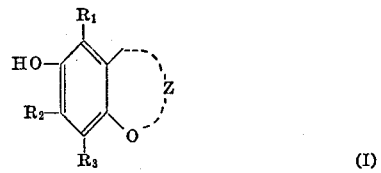

wherein $R_1$, $R_2$ and $R_3$ are the same or different and are a hydrogen atom, an alkyl radical or a phenyl radical, with the proviso that all of the $R_1$, $R_2$ and $R_3$ are not simultaneously hydrogen atoms, and Z is a methylene chain containing 2 or 3 carbon atoms with Z being a chain which can have additional substituents.

DETAILED DESCRIPTION OF THE INVENTION

In the above-described general formula (I), when Z is a methylene chain containing 2 carbon atoms, the general formula represents coumaran compounds, and when Z is a methylene chain containing 3 carbon atoms, the general formula represents chroman compounds. Although the substituents introduced in the methylene chain may be any substituent which does not decrease the property of preventing heat deterioration, it is necessary to consider miscibility with polyesters and sublimating properties. For instance, alkyl radicals such as methyl, ethyl, propyl and butyl are suitable substituents on the Z methylene chain. As alkyl radicals for $R_1$–$R_3$, linear and branched alkyls containing from 1 to about 8 carbon atoms are suitable. Alkyl radicals containing from 4 to 8 carbon atoms are particularly suitable, for their sublimating properties are small. When the alkyl radical contains more than about 10 carbon atoms, miscibility with the polyester decreases.

Representatives coumaran compounds and chroman compounds are as follows:

2,2-dimethyl-5-hydroxy-6-tert-butylcoumaran;
2,2-dimethyl-5-hydroxy-7-tert-butylcoumaran;
2,4,7-trimethyl-5-hydroxycoumaran;
5-hydroxy-6-tert-butylcoumaran;
6-hydroxy-7-tert-butylchroman;
2,2-dimethyl-6-hydroxy-7-tert-butylchroman;
2,2-dimethyl-4-isopropyl-6-hydroxy-7-tert-octylchroman;
2,2-dimethyl-5-ethyl-6-hydroxychroman;
2,2,4-trimethyl-6-hydroxy-7-tert-butylchroman;
2,2-dimethyl-6-hydroxy-7-phenylchroman, and
2,2,4-trimethyl-6-hydroxy-7-tert-octylchroman.

The polyesters of this invention are represented by polyethylene terephthalates produced by the polycondensation of bis-betahydroxyethyl terephthalate represented by the reaction of terephthalic acid with ethylene glycol, by the reaction of dimethyl terephthalate with ethylene glycol, by the reaction of terephthalic acid with ethylene oxide by other known methods, and also involve polyesters containing terephthalic acid as the main acid component and ethylene glycol as the main glycol component. Therefore it is possible to replace a part of the acid component with a dicarboxylic acid such as isophthalic acid, sebacic acid, adipic acid, and the like and one or more ester derivatives thereof, and it is also possible to replace a part of the glycol component with one or more difunctional alcohols such as trimethylene glycol, hexamethylene glycol, polyethylene glycol, and the like. The ratio of the acid components except terephthalic acid and the glycol components except ethylene glycol must be less than about 40 percent.

A sufficient improvement cannot be attained with too little of an amount of the coumaran compound or the chroman compound, and on the other hand yellowing is sometimes caused with too large of an amount. Therefore, the preferred amount added is from about 0.005 to about 1 percent by weight based on the acid components, preferably from about 0.01 to about 0.2 percent by weight. These compounds of the general formula I can be used separately or in combination.

For the addition of the compounds of this invention to polyesters, they can be added to the starting materials prior to the synthesis of the polyesters, they can be added after the completion of ester interchange reaction or they can be added to the produced pellets of polyesters. Although any of these methods can be used and the heat resisting properties of polyesters are improved, generally, it is most effective to add the compounds at the polycondensation step after the completion of the ester interchange reaction because loss caused by volatilization, etc. is minimized and a sufficiently uniform dispersion and mixture with the polyesters can be obtained.

Polyester compositions of this invention can also contain delustering agents such as titanium dioxide silica and the like, at levels above 0.1% by weight, stabilizers such as phosphorous acid, phosphoric acid and organic esters of these acids, at levels of about 0.02 to 0.15% by weight and other conventionally known polyester additives.

The addition of the coumaran compounds and the chroman compounds of this invention to polyesters markedly improves their heat resisting properties. These compounds have excellent miscibilities with polyesters, and, therefore, the resulting polyesters have high transparency. Moreover yellow color formation such as that caused by the use of hydroquinone does not occur. Further surprisingly, the polyesters containing these compounds are brilliant.

Coumaran compounds and chroman compounds of this invention may be prepared by conventional methods. For instance, in the specification of U.S. Pat. No. 2,546,499 a process for preparing coumaran compounds is described, and in *Journal of Chemical Society* 3350 (1959) and the specification of U.S. Pat. No. 2,535,058 processes for preparing chroman compounds are described. Illustrative processes for the preparation of representative compounds are given in the following.

Synthesis of 2,2-dimethyl-5-hydroxy-7-tert-butylcoumaran

One mole of hydroquinone and 2 moles of methallylchloride were added to water containing sodium hydrosulfite and sodium hydroxide, and the mixture was allowed to react in an autoclave for 4 hours at 70° C. After the completion of the reaction the reaction mixture was extracted with ethyl ether. The substance obtained on removal of the ether was treated with hydrobromic acid and acetic acid, thereby 2,2-dimethyl - 5 - hydroxycoumaran was obtained. Thereafter, the 2,2-dimethyl - 5 - hydroxycoumaran was reacted with tert-butylalcohol in the presence of phosphoric acid. After the completion of the reaction the reaction mixture was extracted with ethyl ether and the ether was removed. The resulting residue was recrystallized from n-hexane whereby crystals having a melting point of 150° C. were obtained. It was confirmed to the desired compound by infrared absorption spectral analysis and nuclear magnetic resonance spectral analysis.

Synthesis of 2,2-dimethyl-6-hydroxy-7-tert-butylchroman

To a mixed solution of 1 mole of tert-butylhydroquinone, acetic acid and zinc chloride was added 1 mole of 2-methylbutadiene and the mixture was allowed to react for 1 hours at 100° C. After the completion of the reaction several drops of concentrated sulfuric acid were added to the reaction solution and the resulting solution was further heated for a short time. After cooling, the resulting solution was poured into ice water and the precipitate produced was recovered and washed well with water. By recrystallization of the precipitate from ethyl alcohol crystals having a melting point of 182–183° C. were obtained. This was confirmed to be the desired compound by infrared absorption spectral analysis and nuclear magnetic resonance spectral analysis.

The following examples will further illustrate this invention in greater detail. "Parts" as used in the following examples and comparative examples represents parts by weight and [η] represents the intrinsic viscosity measured in a solvent comprising a mixture of phenol and tetrachloroethane (60/40) at 30.0° C.

EXAMPLE 1

A mixture consisting of 100 parts of dimethylterephthalate, 80 parts of ethylene glycol, 0.12 parts of calcium acetate and 0.03 part of antimony trioxide was heated for about 3 hours at 150–220° C. during which time methanol was evolved. Then 0.1 part of 2,2,4-trimethyl-6-hydroxy-7-tert-butylchroman was added and the resulting mixture was subjected to a polycondensation under a vacuum of 0.1–0.5° mm. Hg for 2 hours at 270–280° C. The polyester obtained was colorless, transparent and brilliant. The [η] was 0.645.

After heat treatment of the polyester at 300° C. for 1 hour in a nitrogen atmosphere, the viscosity was measured. The [η] was 0.600 and the percent lowering of the intrinsic viscosity was 7.5%.

COMPARATIVE EXAMPLE 1

A polyester was produced by a completely similar treatment as described in Example 1 except that the chroman compound of this invention used in Example 1 was omitted. The polyester produced was colorless and transparent, however, it was not brilliant. The [η] was 0.650. When this polyester was subjected to heat treatment in an identical manner to that of Example 1, the [η] was 0.515 and the percent lowering of the intrinsic viscosity was 20.7%.

EXAMPLE 2

After the ester interchange reaction was carried out as in Example 1, 0.1 part of 5-hydroxy-6-tert-butylcoumaran and 0.03 part of phosphorous acid were added and the polycondensation was carried out as described in Example 1. The polyester obtained was colorless, transparent and brilliant. The [η] was 0.655. The [η] measured after a heat treatment similar to that described in Example 1 was 0.598 and the percent lowering was 8.7%.

COMPARATIVE EXAMPLE 2

A polyester was produced by a completely similar treatment to that described in Example 2 except that the coumaran compound of this invention used in Example 2 was omitted. The polyester produced was colorless and transparent, however the polyester produced was not brilliant. The [η] was 0.658. The [η] measured after heat treatment was 0.520 and the percent lowering was 21.0%.

EXAMPLES 3-6

Polyesters were produced as described in Example 2 employing the coumaran compounds and the chroman compounds tabulated in the following Table. The percent lowering by the heat treatment was determined similar to that described in Example 1.

| Ex. | Compound of this invention | Amount of addition | Before heat treatment | After heat treatment | Percent lowering |
|---|---|---|---|---|---|
| 3 | 2,2-dimethyl-6-hydroxy-7-phenylchroman. | 0.1 | 0.650 | 0.590 | 9.2 |
| 4 | 2,2-dimethyl-5-hydroxy-7-tert-butylcoumaran. | 0.1 | 0.650 | 0.594 | 8.6 |
| 5 | 2,2-dimethyl-5-ethyl-6-hydroxychroman. | 0.1 | 0.640 | 0.550 | 14.0 |
| 6 | 2,2,4-trimethyl-6-hydroxy-7-tert-octylchroman. | 0.05 | 0.640 | 0.570 | 10.9 |

EXAMPLE 7

After the ester interchange reaction of a mixture consisting of 100 parts of dimethylterephthalate, 70 parts of ethylene glycol, 20 parts of diethylene glycol, 0.12 part of calcium acetate and 0.03 part of antimony trioxide, to the reaction product were added 0.03 part of phosphorous acid and 0.1 part of 2,2,4-trimethyl-6-hydroxy-7-tert-butylchroman, and the resulting mixture was subjected to a polycondensation reaction as described in Example 1. The polyester obtained was colorless, transparent and brilliant, and the $[\eta]$ was 0.550. The $[\eta]$ measured after heat treatment similar to that described in Example 1 was 0.470, and the percent lowering of the intrinsic viscosity was 14.5%.

For comparison, the percent lowering of the intrinsic viscosity by heat treatment of a polyester produced without the addition of 2,2,4-trimethyl-6-hydroxy-7-tert-butylchroman was above 25%.

EXAMPLE 8

After the ester interchange reaction of a mixture consisting of 100 parts dimethyl terephthalate, 60 parts of ethylene glycol, 50 parts of triethylene glycol, 0.12 part of calcium acetate and 0.03 part of antimony trioxide, to the reaction product were added 0.03 part of phosphorous acid and 0.1 part of 2,2,4-trimethyl-6-hydroxy-7-tert-butylchroman, and the resulting mixture was subjected to a polycondensation reaction as described in Example 1. The polyester obtained was soft, colorless, transparent and brilliant. The $[\eta]$ was 0.324, the $[\eta]$ measured after heat treatment as described in Example 1 was 0.259 and the percent lowering of the intrinsic viscosity was 20.6%.

For comparison, the percent lowering of the intrinsic viscosity by heat treatment of a polyester produced without the addition of 2,2,4-trimethyl-6-hydroxy-7-tert-butylchroman was above 40%.

As is obvious from the results obtained in the Examples and Comparative Examples, polyesters containing coumaran compounds and chroman compounds of this invention do not result in a lowering of the molecular weight by heat, are markedly improved in stability, and are particularly suitable for use in the preparation of fibers, films, tapes, and the like.

What is claimed is:

1. A polyester composition comprising a polyester which is the reaction product of terephthalic acid as the predominant acid component and ethylene glycol as the predominant glycol component and a compound represented by the general formula (I),

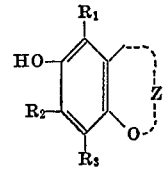

(I)

wherein $R_1$, $R_2$ and $R_3$ are the same or different and represent a hydrogen atom, an alkyl radical or a phenyl radical, with the proviso that all of $R_1$, $R_2$ and $R_3$ are not simultaneously hydrogen atoms, and wherein Z represents a methylene chain containing 2 or 3 carbon atoms, said methylene chain being both unsubstituted or substituted with a substituent selected from the group consisting of a methyl group, an ethyl group, a propyl group and a butyl group.

2. The polyester composition according to claim 1, wherein said acid component comprises more than 40 percent by weight terephthalic acid and wherein said glycol component comprises more than 40 percent by weight ethylene glycol.

3. The polyester composition according to claim 1, wherein the amount of the compound represented by the general formula (I) ranges from about 0.005 to about 1 percent by weight based on the acid component.

4. The polyester composition according to claim 1 wherein the amount of the compound represented by the general formula (I) ranges from about 0.01 to 0.2 percent by weight based on the acid component.

5. The polyester composition according to claim 1, wherein Z is an alkyl substituted methylene chain containing 2 or 3 carbon atoms in said chain.

6. The polyester composition according to claim 5 wherein said alkyl contains from 1 to about 4 carbon atoms.

7. The polyester composition according to claim 1, wherein $R_1$, $R_2$ and $R_3$ are alkyl radicals containing from 1 to 8 carbon atoms.

8. The polyester composition according to claim 1, wherein $R_1$, $R_2$, $R_3$ are alkyl radicals containing from about 4 to 8 carbon atoms.

9. The polyester composition according to claim 1, wherein said compound represented by the general formula (I) is 2,2,4 - trimethyl-6-hydroxy-7-tert-butylchroman.

10. The composition according to claim 1 wherein the polyester is polyethylene terephthalate.

11. The polyester composition according to claim 1, wherein said methylene chain contains two carbon atoms.

12. The polyester composition according to claim 1, wherein said methylene chain contains three carbon atoms.

References Cited
UNITED STATES PATENTS

| | | | |
|---|---|---|---|
| 3,238,178 | 3/1966 | Kibler et al. | 260—45.85 |
| 2,362,479 | 11/1944 | Gibbs | 260—800 |
| 2,535,058 | 12/1950 | Gleim et al. | 44—63 |
| 3,186,962 | 6/1965 | Ranson | 260—45.95 |
| 3,211,652 | 10/1965 | Hinkamp | 252—49.8 |
| 3,227,680 | 1/1966 | Tamblyn et al. | 260—47 |
| 3,239,484 | 3/1966 | Stark | 260—45.9 |
| 3,404,121 | 10/1968 | Barkey | 260—45.7 |
| 3,445,504 | 5/1969 | Mehalso | 260—475 |
| 3,567,799 | 3/1971 | Prevorsek | 260—860 |
| 3,644,573 | 2/1972 | Barkey et al. | 260—860 |
| 3,651,014 | 3/1972 | Witsiepe | 260—75 |

DONALD E. CZAJA, Primary Examiner

R. A. WHITE, Assistant Examiner